(12) United States Patent
Nakamura

(10) Patent No.: US 8,984,757 B2
(45) Date of Patent: Mar. 24, 2015

(54) TRACKING APPARATUS

(75) Inventor: Hiroaki Nakamura, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 473 days.

(21) Appl. No.: 13/430,146

(22) Filed: Mar. 26, 2012

(65) Prior Publication Data
US 2013/0014584 A1    Jan. 17, 2013

(30) Foreign Application Priority Data

Jul. 12, 2011 (JP) ................... 2011-154235

(51) Int. Cl.
*G01C 15/00* (2006.01)
*H04N 5/225* (2006.01)
*G01S 3/786* (2006.01)
*G01S 3/781* (2006.01)
*F41G 3/22* (2006.01)
*G02B 27/64* (2006.01)

(52) U.S. Cl.
CPC ............... *G01S 3/7864* (2013.01); *G01S 3/781* (2013.01); *F41G 3/22* (2013.01); *G02B 27/644* (2013.01)
USPC ............................................. 33/286; 348/169

(58) Field of Classification Search
USPC .................... 33/286, 1 PT; 348/169
See application file for complete search history.

(56) References Cited

U.S. PATENT DOCUMENTS

| 8,098,893 | B2 | 1/2012 | Nakamura et al. | |
| 8,385,065 | B2* | 2/2013 | Weaver et al. | 348/169 |
| 2009/0115850 | A1* | 5/2009 | Nakamura | 348/169 |
| 2009/0262197 | A1 | 10/2009 | Nakamura | |
| 2010/0238296 | A1 | 9/2010 | Nakamura | |
| 2011/0304736 | A1* | 12/2011 | Evans et al. | 348/169 |
| 2011/0304737 | A1* | 12/2011 | Evans et al. | 348/169 |
| 2012/0212622 | A1 | 8/2012 | Nakamura et al. | |
| 2013/0208128 | A1* | 8/2013 | Steffensen et al. | 348/169 |

FOREIGN PATENT DOCUMENTS

| JP | 2005-114035 A | 4/2005 |
| JP | 2006-106910 A | 4/2006 |
| JP | 2006-2955908 A | 10/2006 |
| JP | 2008-311373 A | 12/2008 |
| JP | 2009-135471 A | 6/2009 |
| JP | 2009-234524 A | 10/2009 |

OTHER PUBLICATIONS

U.S. Appl. No. 13/224,444, filed Sep. 2, 2011, Nakamura, Hiroaki.
International Search Report dated Dec. 22, 2009 from PCT/JP2009/066970.
Chinese First Office Action dated Jun. 27, 2014 from CN Application No. 2011-154235, 4 pages.
Japanese First Office Action dated Jun. 27, 2014 from JP Application No. 2011-154235, 4 pages.
Japanese Final Office Action dated Aug. 19, 2014 from JP Application No. 2011-154235, 4 pages.

* cited by examiner

*Primary Examiner* — G. Bradley Bennett
(74) *Attorney, Agent, or Firm* — Ohlandt, Greeley, Ruggiero & Perle, L.L.P.

(57) ABSTRACT

According to one embodiment, a tracking apparatus includes a spherical body, three or more spherical driving units, a hold unit, a control unit. The three or more spherical driving units are connected to the movable body and kept in contact with portions of the spherical body to move the movable body in a desired direction. The hold unit connects the third gimbal to the movable body, and holds the spherical driving units pressed against the spherical body. The control unit controls the spherical driving units to track the target, using the first to fourth rotation angles.

8 Claims, 7 Drawing Sheets

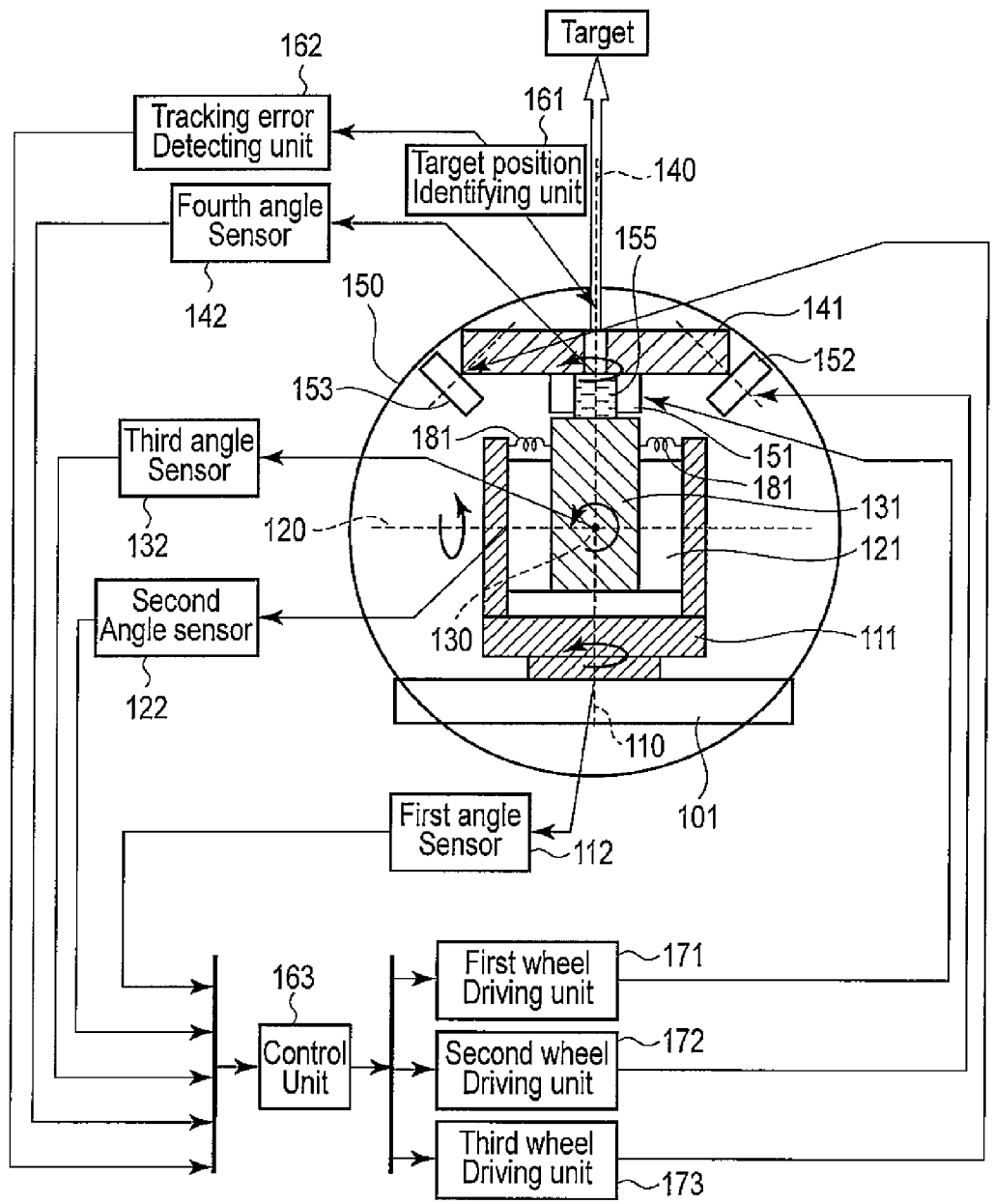
F I G. 1

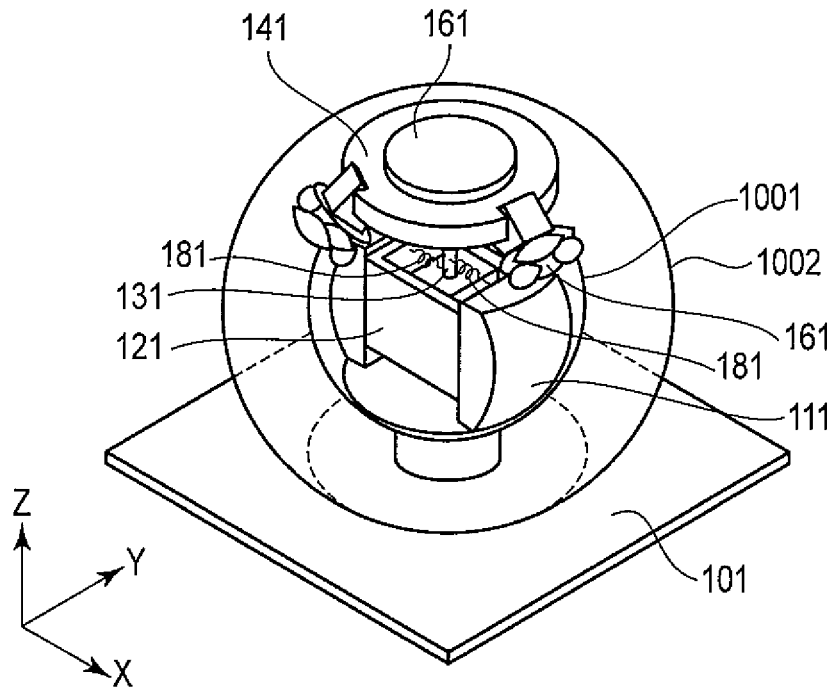
F I G. 10A
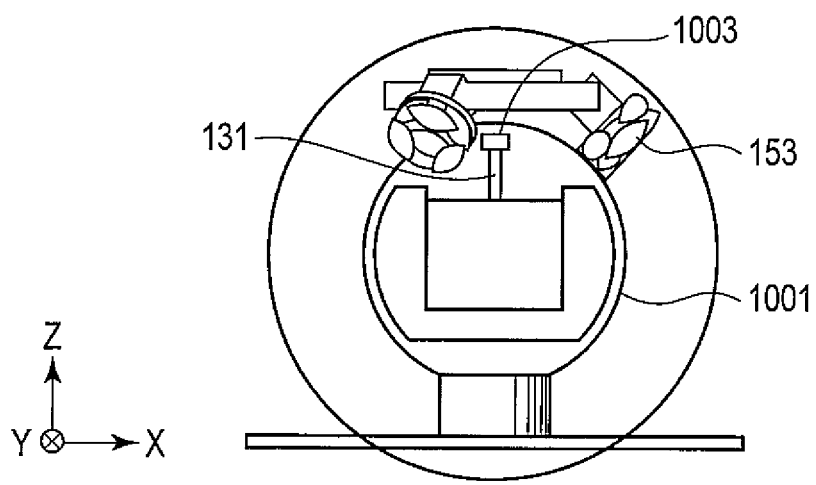
F I G. 10B

TRACKING APPARATUS

CROSS-REFERENCE TO RELATED APPLICATIONS

This application is based upon and claims the benefit of priority from prior Japanese Patent Application No. 2011-154235, filed Jul. 12, 2011, the entire contents of which are incorporated herein by reference.

FIELD

Embodiments described herein relate generally to tracking apparatuses for causing a target recognition sensor, such as a camera, to track a target that moves in all directions.

BACKGROUND

In recent years, various systems capable of tracking objects using, for example, an ITV camera, to perform continuous monitoring or obtain detailed information have been commercialized for use in large-scale facilities, such as airports and factories, security equipment employed in electrical power plants or water-supply corporations associated with lifeline, and traffic information support systems, such as ITSs. These tracking systems have a structure contrived to be used not only as ground equipment, but also as systems installed on a moving platform such as a vehicle, ship or airplane. To this end, the structure is made compact and resistance against vibration. More specifically, the tracking systems perform disturbance suppression against vibration and swinging. Further, to enable the tracking systems to sequentially track a plurality of targets, it has come to be important to increase tangential velocity of the systems to cause them to be directed to the targets in a short time.

In such a conventional moving object image tracking system as the above, to track a target that moves in all directions, a gimbal structure is often employed. The gimbal structure needs to have at least two axes. In a biaxial gimbal, when a target passes through or near the zenith, it is necessary for its Az axis to instantly shift its orientation from the front to the rear, namely, to instantly rotate through about 180 degrees. However, since there is a limit in motor torque, this operation is difficult to perform, with the result that such a phenomenon as a so-called gimbal lock, in which continuous tracking becomes impossible, will occur. Thus, in the biaxial gimbal structure, the gimbal cannot be oriented toward the zenith or its neighborhood, which makes it difficult to continuously track a target in all directions.

To overcome this disadvantage, image tracking systems having a triaxial gimbal structure exist. In the triaxial gimbal structure, the freedom of motion is increased, and motion is divided into Az axis motion and xEL axis motion in order to avoid excessive angular velocity, thereby enabling the gimbal to continuously track a target in all directions within an allowable gimbal rotation range and without gimbal lock.

Other types of conventional tracking mechanisms, which employ no gimbal structure, have been proposed. In these mechanisms, a frictional rolling motion mechanism rotates a spherical casing in all directions.

Further, a convey apparatus has been proposed as a mechanism for rotating a spherical movable body utilizing friction. In this apparatus, it is difficult to reduce the size, and a control rule for tracking a target is complex. For instance, if the apparatus has a triaxial gimbal structure, the number of driving means, such as motors, increases, which makes reduction of size and cost difficult. Further, since the apparatus is provided with, for example, a camera, the load inertia of the xEL axis is high, which increases the possibility of axial interference between the Az axis and the xEL axis. This is a problem peculiar to the triaxial structure. Although it is possible to reduce the angular velocity of the Az axis using a redundancy axis, the Az axis requires a higher angular velocity than the other axes, the required driving torque will be inevitably increased.

In the systems with no conventional gimbal structure, there is no problem of gimbal lock. In this case, however, it is difficult to achieve automation of the systems as moving object image tracking systems. For instance, it is necessary to manually drive a spherical body employed therein by remote control until a target enters the image screen of a camera used therein. Further, these systems do not have any element for acquiring information concerning the orientation of the camera. Because of the above, it is difficult for the systems to realize automatic tracking of targets using information obtained from images of the targets. In addition, in these systems, wireless communication is performed with, for example, the camera in the spherical body, which inevitably limits the operation period of the camera.

Moreover, although the above-mentioned conventional mechanism for driving the spherical body is applicable to, for example, a moving apparatus, it cannot easily be applied to moving object image tracking systems. For example, in the mechanism, the spherical body is moved, with a table, installed therein, kept horizontal. This makes it difficult to orient the camera in an arbitrary direction.

BRIEF DESCRIPTION OF THE DRAWINGS

FIG. 1 is a block diagram illustrating a tracking apparatus according to a first embodiment;

FIG. 6A shows an initial state, FIG. 6B shows a state in which the movable body shifts diagonally leftward, FIG. 6C shows a state in which the first and second gimbals rotate in accordance with the diagonally leftward shift of the movable body, and FIG. 6D shows a state in which the third gimbal is returned to the center of the rotation range thereof, and the first and second gimbals rotate in their respective directions;

FIG. 10A is a perspective view illustrating a tracking apparatus according to a second embodiment, and FIG. 10B is a front view of the apparatus of the second embodiment.

DETAILED DESCRIPTION

Tracking apparatuses according to embodiments will be described in detail with reference to the accompanying drawing. In the embodiments, like reference numbers denote like elements, and duplication of description will be avoided.

In general, according to the embodiments, a tracking apparatus includes a spherical body, a first gimbal, a second gimbal, a third gimbal, a movable body, three or more spherical driving units, a hold unit, an identifying unit, a first angle sensor, a second angle sensor, a third angle sensor, a fourth angle sensor, a rotation spring driving unit, and a control unit. The first gimbal is supported by a bottom of the spherical body and is configured to rotate about a first gimbal axis extending vertical. The second gimbal is supported by the first gimbal and is configured to rotate about a second gimbal axis perpendicular to the first gimbal axis. The third gimbal is supported by the second gimbal and is configured to rotate about a third gimbal axis perpendicular to the second gimbal axis at an intersection between the first gimbal axis and the second gimbal axis. The movable body is supported by the third gimbal and is configured to rotate about a fourth gimbal axis perpendicular to the third gimbal axis. Three or more spherical driving units are connected to the movable body and are kept in contact with portions of the spherical body to move the movable body in a desired direction. The hold unit connects the third gimbal to the movable body, and holds the spherical driving units pressed against the spherical body. The identifying unit is supported by the movable body and is configured to output position data of a target. The first angle sensor is configured to detect a first rotation angle of the first gimbal relative to the bottom. The second angle sensor is configured to detect a second rotation angle of the second gimbal relative to the first gimbal. The third angle sensor is configured to detect a third rotation angle of the third gimbal relative to the second gimbal. The fourth angle sensor is configured to detect a fourth rotation angle of the movable body relative to the third gimbal. The rotation spring driving unit is configured to return the third gimbal to a center of a rotation range of the third gimbal. The control unit is configured to control the spherical driving units to track the target, using the first to fourth rotation angles.

The tracking apparatuses of the embodiments are obtained by applying a moving object image tracking system to a tracking system for emitting light to a moving object.

The embodiments have been developed in light of the above-mentioned problem, and aim to provide a tracking apparatus capable of automatically tracking a target in all directions without requiring excessive angular velocity.

(First Embodiment)

Figure 2A:
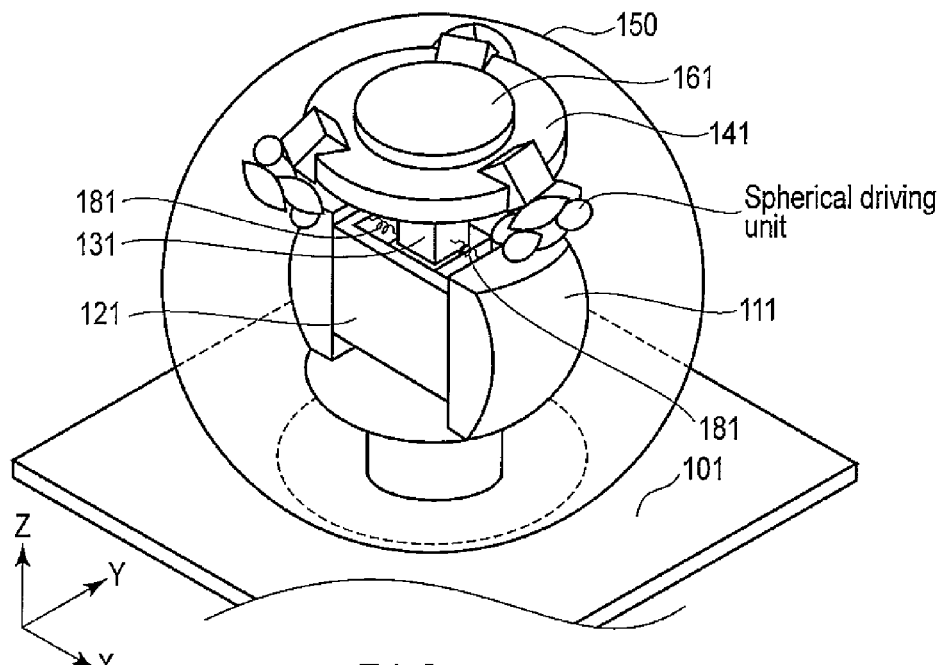
FIG. 2A is a perspective view illustrating the tracking apparatus shown in FIG. 1.
Figure 2B:
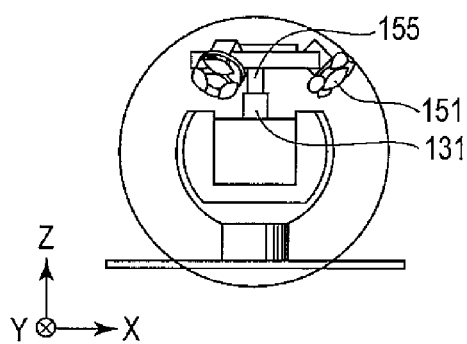
FIG. 2B is a front view of the apparatus.
Figure 2C:
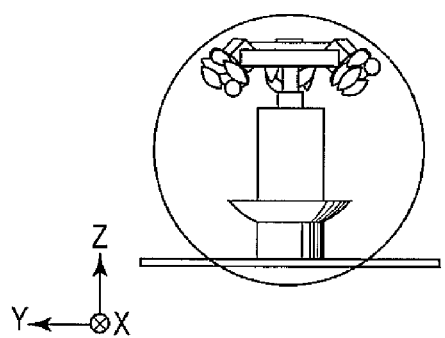
FIG. 2C is a side view of the apparatus.
Figure 2D:
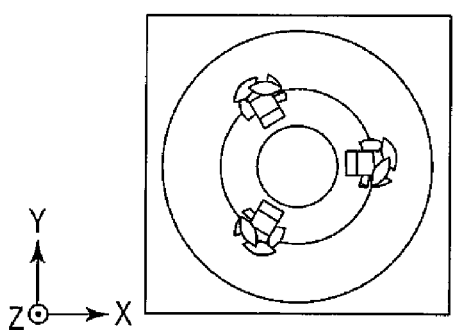
FIG. 2D is a top plan view of the apparatus.

Referring first to FIG. 1 and FIGS. 2A and 2B, a tracking apparatus according to a first embodiment will be described. FIG. 1 is a block diagram illustrating the tracking apparatus. FIG. 2A is a perspective view of the tracking apparatus shown in FIG. 1, as viewed from a direction of a vector (X, Y, Z)=(1, −1, 1), the Z-axis direction being set as a zenith direction. FIG. 2B is a front view of the apparatus, as viewed from the negative Y direction. FIG. 2C is a side view of the apparatus, as viewed from the negative X direction. FIG. 2D is a top plan view of the apparatus, as viewed from the positive Z direction. The X, Y and Z directions are defined in these figures.

The tracking apparatus of the first embodiment comprises first, second and third gimbals 111, 121 and 131, a movable body 141, a base 101, first, second, third and fourth angle sensors 112, 122, 132, 142, a spherical body 150, wheels 151, 152 and 153, a drive hold unit 155, a target position identifying unit 161, a tracking error detecting unit 162, a control unit 163, and first, second and third wheel driving units 171, 172 and 173. The combination of each wheel and the corresponding wheel driving unit will hereinafter be referred to as the "spherical driving unit."

In the first embodiment, the spherical body 150 contains the first, second and third gimbals 111, 121 and 131, the movable body 141, the base 101, the first, second, third and fourth angle sensors 112, 122, 132, 142, the wheels 151, 152 and 153, the drive hold unit 155, the target position identifying unit 161, the tracking error detecting unit 162, the control unit 163, and the first, second and third wheel driving units 171, 172 and 173. The spherical body 150 is formed of a material that enables the target position identifying unit 161 to identify a target. For instance, the spherical body 150 is formed of a transparent material that permits, to pass therethrough, light that can be detected by the target position identifying unit 161.

The first gimbal 111 is supported by the base 101 provided at the bottom of the spherical body 150 so that it can rotate about a first rotation axis 110 which extends vertically and serves as a first gimbal axis. The second gimbal 121 is supported by the first gimbal 111 so that it can rotate about a second rotation axis 120 which is arranged perpendicular to the first rotation axis 110 and is horizontally rotatable. The third gimbal 131 is supported by the second gimbal 121 so that it can rotate about a third rotation axis 130 which is rotatable and perpendicular to the second rotation axis 120. In FIG. 1, the third rotation axis 130 is perpendicular to the sheet of the drawing.

Further, a rotary spring driving mechanism 181 is provided in association with the third rotation axis 130. The spring driving mechanism 181 urges the third gimbal 131 to the center of rotation by its restoring force. For instance, when the third gimbal 131 slightly moves clockwise or counterclockwise about the third rotation axis 130, the spring driving mechanism 181 rotates the second gimbal 121 and the first gimbal 111 so as to return the third gimbal 131 to the center of rotation. The spring driving mechanism 181 may be coupled to, for example, the shaft of the third gimbal axis, or be incorporated in the third gimbal 131 or the drive hold unit 155.

The base 101 is coupled to the first gimbal 111 to support the first gimbal 111, the second gimbal 121, the third gimbal 131, the movable body 141 and the target position identifying unit 161, thereby serving as a table for placing the tracking apparatus thereon.

The movable body 141 is coupled to the third gimbal 131 via the drive hold unit 155. The movable body 141 is provided perpendicular to the third rotation axis 130, and can rotate about a movable axis 140 as a movably supported fourth rotation axis. The movable body 141 is provided with at least three spherical driving units for driving the body 141 itself. The spherical driving units restrict the movement of the third gimbal and the movable body. The spherical driving units comprise wheels (e.g., omni-wheels 151, 152 and 153) for moving the movable body 141 relative to the spherical body 150, and the wheel driving units 171, 172 and 173 for rotating the wheels. FIG. 1 and FIGS. 2A to 2D show an example case where three omni-wheels 151 to 153 are arranged at regular circumferential intervals of 120 degrees. The "omni-wheel" is a collective term of a wheel (rotary body) that can not only rotate the spherical body as a wheel, but also move in a direction different from the direction of the rotation. The rotation axis of each omni-wheel is connected to the rotation axis of the corresponding wheel driving unit, and the wheel main body of each omni-wheel is rotated by the same. The spherical driving units can rotate the movable body 141 in a desired direction relative to the spherical body 150. The spherical driving units may incorporate rotary springs for pressing the wheels against the spherical body.

The movable body 141 also incorporates the target position identifying unit 161 for outputting target position data. The target position identifying unit 161 is also called as a target identifying sensor, and is, for example, a camera sensor. It identifies a target and obtains image data thereof.

The drive hold unit 155 connects the third gimbal 131 to the movable body 141 not only to make the third gimbal 131 and the movable body 141 rotatable relative to each other, but also to keep the wheels of the spherical driving units pressed against the spherical body 150. This structure enables the movable body 141 to smoothly move along the inner surface of the spherical body 150. The drive hold unit 155 is provided with, for example, a compression spring, the restoring force of which upwardly urges the movable body 141 in the example of FIG. 1, thereby pressing the omni-wheels against the inner surface of the spherical body 150. Since the omni-wheels are thus pressed against the inner surface of the spherical body 150 with an optimal force by the spring of the drive hold unit 155, the spherical driving units can transfer the driving forces of the first to third wheel driving units 171 to 173 to the spherical body 150, using the frictional force between the spherical body 150 and the omni-wheels 151 to 153. Further, the drive hold unit 155 is, for example, a bearing or an encoder, through which the third gimbal 131 is coupled to the movable body 141.

The first, second, third and fourth rotation axes 110, 120, 130 and 140 are provided with first, second, third and fourth angle sensors 112, 122, 132 and 142, respectively. The first angle sensor 112 detects the rotation angle of the first gimbal 111. The second angle sensor 122 detects the rotation angle of the second gimbal 121 relative to the first gimbal 111. The third angle sensor 132 detects the rotation angle of the third gimbal 131 relative to the second gimbal 121. The fourth angle sensor 142 detects the rotation angle of the movable body 141 relative to the third gimbal 131. The fourth angle sensor 142 is, for example, an encoder.

The tracking error detecting unit 162 processes image data acquired from the target position identifying unit 161 to detect tracking error values. In general, the tracking error detecting unit 162 converts the image data into monochrome image data by digitization, thereby extracting the characterizing point of a target from the image data to identify the position of the target in the viewing field of the camera and to regard the two-directional amounts (ΔX, ΔY) of the target deviated from the center of the viewing field as tracking error detection values. The process time including the above image processing is a sampling time required for obtaining the tracking error detection values that will be described later with reference to FIG. 7.

The control unit 163 acquires data concerning the aforementioned four angles from the first, second, third and fourth angle sensors 112, 122, 132 and 142, respectively, thereby identifying the orientation of the target position identifying unit 161, and instructing the first, second and third wheel driving units 171, 172 and 173 to make, zero, the tracking error detection values acquired from the tracking error detecting unit 162 to drive the wheels 151, 152 and 153. In other words, the control unit 163 calculates virtual position data associated with the same coordinate system as that of the target position identifying unit 161, using the four angles, and controls the spherical driving units to make the virtual position data coincide with the position data output from the target position identifying unit 161.

Figure 3A:
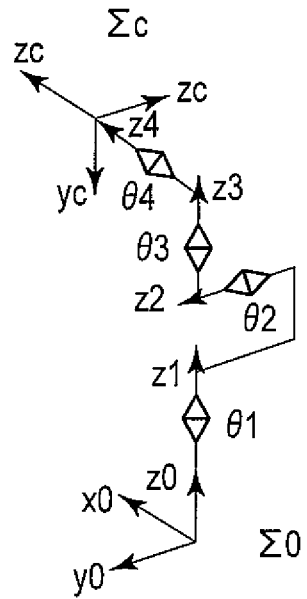
FIG. 3A shows the respective rotation axes of the first to third gimbals and the movable body incorporated in the tracking apparatus of FIG. 1.
Figure 3B:
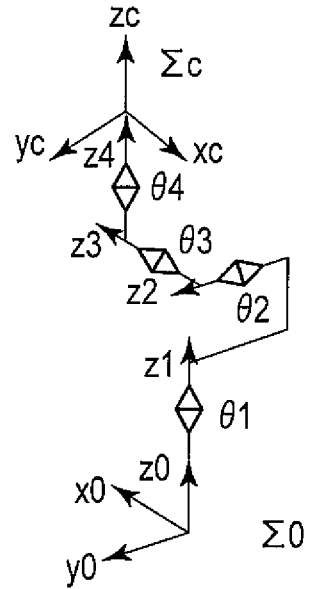
FIG. 3B shows the respective rotation axes of the first to third gimbals and the movable body.

Referring then to FIGS. 3A and 3B, a rough description will be given of the first, second, third and fourth rotation axes 110, 120, 130 and 140 of the first, second, third and fourth gimbals 111, 121 and 131 and the movable body 141, which are set with respect to the spherical body 150. FIG. 3A shows a case where the target position identifying unit 161 is oriented horizontally, and FIG. 3B shows a case where the target position identifying unit 161 is oriented vertically (i.e., oriented toward the zenith). FIG. 3A shows the respective rotation axes of the first to third gimbals and the movable body incorporated in the tracking apparatus of FIG. 1, these rotation axes being assumed when the target position recognition unit of the apparatus is oriented horizontally. FIG. 3B shows the respective rotation axes of the first to third gimbals and the movable body, assumed when the target position recognition unit is oriented toward the zenith. FIGS. 2A to 2D show a case where the movable body 141 is oriented upward, i.e., the target position identifying unit 161 is oriented toward the zenith.

With reference to the coordinate system Σ0 of the spherical body 150, the first, second, third and fourth rotation axes 110, 120, 130 and 140 of the first, second, third and fourth gimbals 111, 121 and 131 and the movable body 141 are set. The angle sensors are provided in association with these rotation axes. The first angle sensor 112 detects the rotation angle θ1 of the first gimbal 111 relative to the spherical body 150. The second angle sensor 122 detects the rotation angle θ2 of the second gimbal 121 relative to the first gimbal 111. The third angle sensor 132 detects the rotation angle θ3 of the third gimbal 131 relative to the second gimbal 121. The fourth angle sensor 142 detects the rotation angle θ4 of the movable body 141 relative to the third gimbal 131. Further, the aforementioned rotary spring driving mechanism 181 is provided in association with the third rotation axis 130. This mechanism has a restoring force for returning, to the center of the rotation range, the third gimbal 131 that can be externally rotated. In other words, the mechanism returns the third gimbal 131 to its initial position assumed when no external force is exerted on the gimbal 131.

Figure 4:
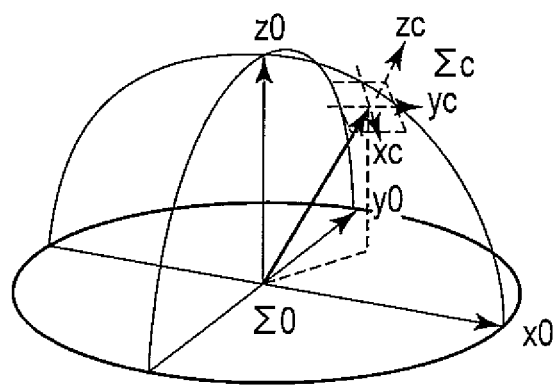
FIG. 4 is a schematic view illustrating the position of the movable body 141 relative to a spherical body 150.

Referring to FIG. 4, a description will be given of the position of the movable body 141 relative to the spherical body 150.

The rotation axes have the same intersection, and are therefore associated, only in rotation transform, with the coordinate system Σc of a camera that serves as the target position identifying unit 161 and is provided on the movable body 141. Accordingly, the movable body 141 is positioned on a spherical coordinate system associated with the spherical body 150.

Referring then to FIGS. 5A to 5D, the relationship between the spherical body 150, the omni-wheels and driving directional vectors will be described.

Figure 5A:
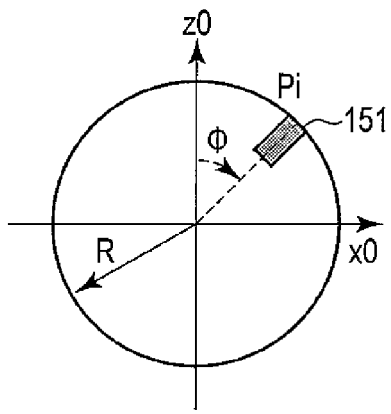
FIG. 5A is a front view illustrating the position of a wheel.
Figure 5B:
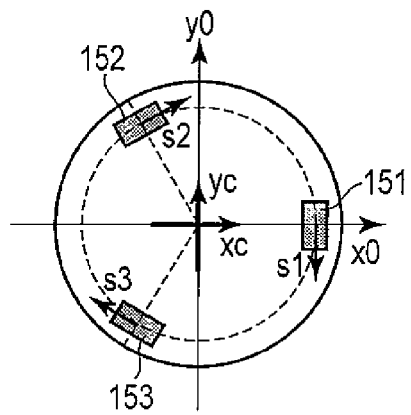
FIG. 5B is a top view illustrating the driving direction vector of each wheel.

FIG. 5A is a front view corresponding to FIG. 2B, and FIG. 5B is a top view corresponding to FIG. 2D. FIG. 5B shows a state in which the movable body 141 is oriented upward, and the coordinate system Σ0 of the spherical body 150 coincides with that Σc of the camera. A description will now be given of an instance where, for example, the spherical body 150 has a radius of R, and three omni-wheels i (i=1 to 3) are attached to the spherical body at an attachment angle of φ with respect to the z0 axis extending toward the zenith, and arranged at regular circumferential intervals of 120 degrees. The coordinates $P_i$ (i=1 to 3) of contacts between the spherical body 150 and each wheel i are given by $$P_1 = [R \cdot \sin\phi \quad 0 \quad R \cdot \cos\phi]$$

$$P_2 = [-\tfrac{1}{2} \cdot R \cdot \sin\phi \quad \sqrt{3}/2 \cdot R \cdot \sin\phi \quad R \cdot \cos\phi]$$

$$P_2 = [-\tfrac{1}{2} \cdot R \cdot \sin\phi \quad -\sqrt{3}/2 \cdot R \cdot \sin\phi \quad R \cdot \cos\phi] \quad [1]$$

Further, the driving-directional vector $s_i$ (i=1 to 3) of each contact is given by $$s_1 = [0 \; -1 \; 0]$$

$$s_2 = [\sqrt{3}/2 \; \tfrac{1}{2} \; 0]$$

$$s_3 = [\sqrt{3}/2 \; \tfrac{1}{2} \; 0] \quad [2]$$

Using these relationships, the relationship between the angular velocity $\omega_j$ (j=x, y, z), expressed by $[\omega_x \; \omega_y \; \omega_z]$, of the movable body 141 about the axes (x, y, z) of the camera coordinate system, and the circumferential velocity vsi (i=1 to 3) of each wheel i is given by $$\begin{bmatrix} vs1 \\ vs2 \\ vs3 \end{bmatrix} = R \begin{bmatrix} \cos\phi & 0 & -\sin\phi \\ -\tfrac{1}{2}\cos\phi & +\tfrac{\sqrt{3}}{2}\cos\phi & -\sin\phi \\ -\tfrac{1}{2}\cos\phi & -\tfrac{\sqrt{3}}{2}\cos\phi & -\sin\phi \end{bmatrix} \begin{bmatrix} \omega_x \\ \omega_y \\ \omega_z \end{bmatrix} \quad [3]$$

From this equation, the rotational speed of the motor, used to detect the angular velocity of the movable body 141 on the coordinate system of the camera provided on the movable body 141, can be determined.

For instance, to rotate the movable body 141 in the x-direction, angular velocity $\omega_y$ about the axis y is applied to the movable body 141. At this time, from the equation [3], vsi (i=1 to 3) is given by $$(vs1, vs2, vs3) = (0, \sqrt{3}/2 \cos\phi, -\sqrt{3}/2 \cos\phi)$$

Figure 5C:
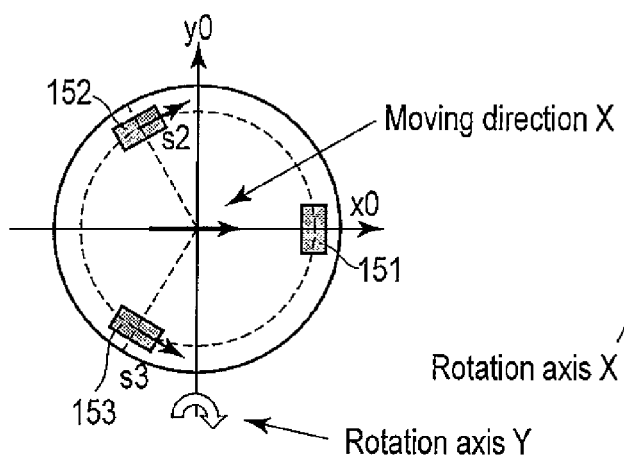
FIG. 5C is another top view illustrating a case where the movable body is intended to be driven in the x-direction.

In this case, the wheels (152 and 153) are rotated so that the motor rotational direction corresponding to vector s2 is opposite to the motor rotational velocity corresponding to vector s1, as is shown in FIG. 5C.

Further, to rotate the movable body 141 in the y-direction, angular velocity $\overline{\omega}x$ about the axis x is applied to the movable body 141. At this time, from the equation [3], vsi (i=1 to 3) is given by $$(vs1, vs2, vs3) = (\cos\phi, -\tfrac{1}{2} \cos\phi, -\tfrac{1}{2} \cos\phi)$$

Figure 5D:
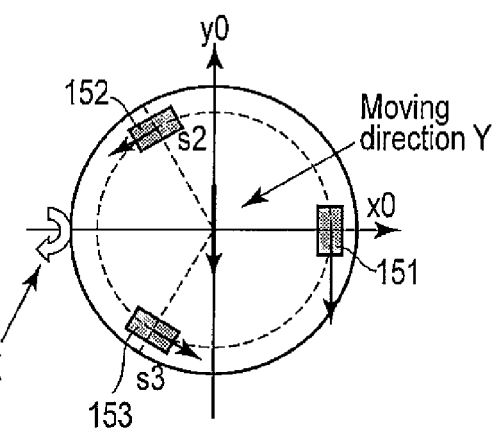
FIG. 5D is yet another top view illustrating a case where the movable body is intended to be driven in the y-direction.

In this case, the wheels (151, 152 and 153) are rotated so that the motor rotational direction corresponding to vector s2 is opposite to the motor rotational velocity corresponding to vector s1, and the absolute value of vectors s2 and s3 is half that of vector s1, as is shown in FIG. 5D.

Referring then to FIGS. 6A to 6D, a description will be given of changes in the attitudes of the gimbals assumed when the movable body 141 is driven by the spherical driving units along the inner surface of the spherical body 150.

Figure 6A:
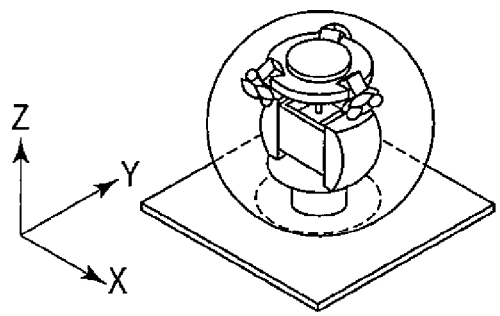
FIGS. 6A, 6B, 6C and 6D are perspective views useful in explaining a case where the movable body shifts from a state in which it is oriented upward, to a state in which it is oriented diagonally leftward.
Figure 6B:
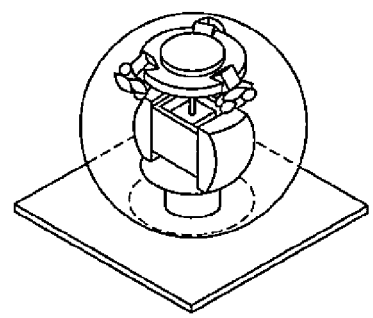
Figure 6C:
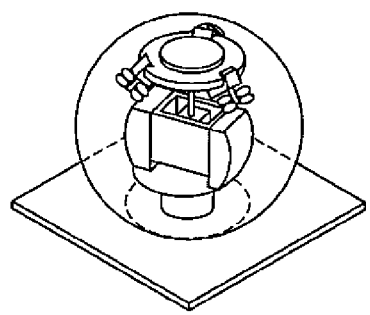
Figure 6D:
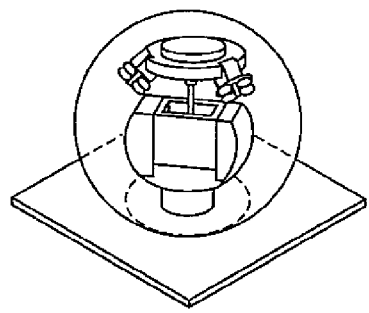

FIGS. 6A to 6D show a case where the movable body 141 shifts from an upward oriented state to a rearward oriented state, i.e., a diagonally leftward oriented state ((X, Y, Z)=(−1, 1, 0)). As in FIG. 2B, the frontward direction is set as the negative Y direction. FIG. 6A shows an initial state where if the movable body 141 is upward oriented, the third gimbal 131 is also upward oriented. When the movable body 141 starts to be moved diagonally leftward by the operations of the spherical driving units, the first to third gimbals coupled to the movable body 141 are driven in accordance with the motion of the movable body 141, as is shown in FIG. 6B. At this time, the third gimbal 131 closest to the movable body 141 initially rotates. When the diagonally leftward motion of the movable body 141 advances as shown in FIG. 6C, the first and second gimbals also rotate about their respective axes. At this time, the rotation spring associated with the third rotation axis 130 is driven to produce a restoration force for returning the third rotation axis 130 to the center of its rotation range. This restoration force is distributed to the first and second gimbals 111 and 121 to rotate them. When the motion of the movable body 141 further advances as shown in FIG. 6D, a state is assumed in which the third gimbal 131 is returned to the center of the rotation range, and only the first and second gimbals 111 and 121 can rotate (in accordance with the motion of the movable body 141). As described above, the tracking apparatus of the first embodiment has a passive redundancy caused by driving the rotation spring in association with the third rotation axis 130. This feature enables the first to third gimbals to be driven by the motion of the movable body 141 even when the third gimbal 131 is oriented toward the zenith or its vicinity.

Figure 7:
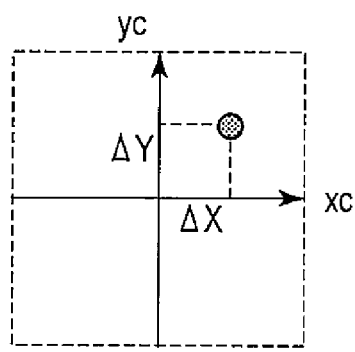
FIG. 7 is a view illustrating a tracking error between the field of a camera and a moving object in the first embodiment.

Referring to FIG. 7, the relationship between the viewing field of a camera image and a target will be described.

When a target is captured within the viewing field of a camera as the target position identifying unit 161 on the movable body 141, using the coordinate system $\Sigma c$ of the camera, tracking error detection values ($\Delta X$, $\Delta Y$) as the amounts deviated from the center of the camera are acquired. In general, the tracking error detection values are acquired by calculating the center of gravity associated with a characterizing point obtained from image information.

Figure 8:
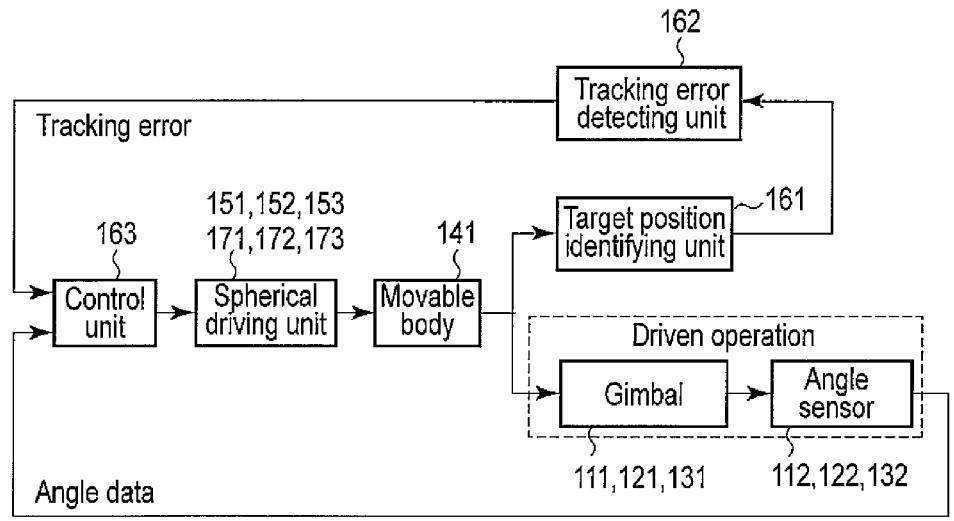
FIG. 8 is a block diagram useful in explaining a control system for tracking the moving object.

Referring to FIG. 8, a tracking control system according to the first embodiment will be described. FIG. 8 is a block diagram illustrating the tracking control system for tracking a moving target.

When the movable body 141 is driven on the inner surface of the spherical body 150 by the spherical driving units, the target position identifying unit 161 on the movable body 141 is swung to acquire image data including a target, thereby acquiring tracking error detection values ($\Delta X$, $\Delta Y$) as position data concerning the target. Further, in accordance with the swing motion of the movable body 141, the first to third gimbals 111 to 131 are driven. At this time, since the gimbals 111, 121 and 131 and the movable body 141 are provided with the first, second, third and fourth angle sensors 112, 122, 132 and 142, angle data ($\Theta 1$, $\theta 2$, $\theta 3$ and $\theta 4$) indicating the attitude of the movable body 141 is obtained.

Based on the tracking error detection values and the angle data, the control unit 163 generates angular velocity instructions for driving the spherical driving units.

To control the movable body 141 so as to make the target position identifying unit 161 track a target, it is necessary to cause the coordinate system of the camera to coincide with that of the driving directional vector, and to perform tracking control for generating angular velocities that reduce tracking errors. Assuming that the tracking error detection values ($\Delta X$, $\Delta Y$) are inputs, and tracking gain $K_C$ as a tracking proportional gain is a constant, angular velocity instruction $\omega_{jr}$ (j=x, y, z) for the movable body 141 is given by $$\begin{bmatrix} \omega_{xr} \\ \omega_{yr} \\ \omega_{zr} \end{bmatrix} = \begin{bmatrix} K_c & 0 & 0 \\ 0 & K_c & 0 \\ 0 & 0 & 0 \end{bmatrix} \begin{bmatrix} \Delta Y \\ \Delta X \\ 0 \end{bmatrix} \quad [4]$$

Further, it is necessary to orient the movable body 141 toward a target where the target position identifying unit 161 does not catch the target. Assuming that the position vector of the target is (eT_x, eT_y, eT_z), the relationship between the position vector of the target (eT_x, eT_y, eT_z) and the angles ($\theta_{r1}$, $\theta_{r2}$) of the target on an easily designated spherical coordinate system is expressed by the following equations [5]:

$$\begin{cases} eT\_x = \cos\theta_{r2} \cdot \cos\theta_{r1} \\ eT\_y = \cos\theta_{r2} \cdot \sin\theta_{r1} \\ eT\_z = \sin\theta_{r2} \end{cases} \quad [5]$$

Since the tracking apparatus of the first embodiment comprises angle sensors corresponding to the gimbals, the orientation of the movable body 141 can be detected. Assume here that angle data corresponding to the first, second and third gimbals 111, 121 and 131 and the movable body 141 are set to θ1, θ2, θ3 and θ4, respectively. The position vector of the target in the coordinate system Σ0 of the spherical body 150 is the sum of the visual axis vector from the origin of the coordinate system Σ0 to the origin of the coordinate system Σc of the camera, and the virtual tracking error vector (dltX, dltY) of the target position in the virtual camera coordinate system Σc associated with the virtual gimbals. The coordinate transform matrices $^{0}R_1$, $^{1}R_2$, $^{2}R_3$, $^{3}R_4$, $^{4}R_c$ corresponding to the rotation axes are expressed by the following equations [6]:

$$^{0}R_1 = \begin{bmatrix} \cos\theta 1 & -\sin\theta 1 & 0 \\ \sin\theta 1 & \cos\theta 1 & 0 \\ 0 & 0 & 1 \end{bmatrix}$$

$$^{1}R_2 = \begin{bmatrix} 1 & 0 & 0 \\ 0 & 0 & 1 \\ 0 & -1 & 0 \end{bmatrix} \begin{bmatrix} \cos\theta 2 & -\sin\theta 2 & 0 \\ \sin\theta 2 & \cos\theta 2 & 0 \\ 0 & 0 & 1 \end{bmatrix}$$

$$^{2}R_3 = \begin{bmatrix} 1 & 0 & 0 \\ 0 & 0 & -1 \\ 0 & 1 & 0 \end{bmatrix} \begin{bmatrix} \cos\theta 3 & -\sin\theta 3 & 0 \\ \sin\theta 3 & \cos\theta 3 & 0 \\ 0 & 0 & 1 \end{bmatrix}$$

$$^{3}R_4 = \begin{bmatrix} 1 & 0 & 0 \\ 0 & 0 & 1 \\ 0 & -1 & 0 \end{bmatrix} \begin{bmatrix} 0 & 0 & 1 \\ 0 & 1 & 0 \\ -1 & 0 & 0 \end{bmatrix}$$

$$^{4}R_c = \begin{bmatrix} \cos\theta 4 & -\sin\theta 4 & 0 \\ \sin\theta 4 & \cos\theta 4 & 0 \\ 0 & 0 & 1 \end{bmatrix}$$

[6]

The transform matrix from the coordinate system Σ0 of the spherical body 150 to the camera coordinate system Σc is given by $$^{0}R_c = {}^{0}R_1\,{}^{1}R_2\,{}^{2}R_3\,{}^{3}R_4\,{}^{4}R_c \quad [7]$$

From the above relationships, the relationship between the inner product of the position vector of the target and the attitude of the tracking mechanism, and the position vector of the target is given by $$\begin{bmatrix} dot\_eT\_eX \\ dot\_eT\_eY \\ dot\_eT\_eE \end{bmatrix} = (^{0}R_c)^{-1} \begin{bmatrix} eT\_x \\ eT\_y \\ eT\_z \end{bmatrix} \quad [8]$$

where dot_eT_eX represents the inner product of the position vector eT of the target and the horizontal unit vector eX of the camera associated with the gimbals, dot_eT_eY represents the inner product of the position vector eT of the target and the vertical unit vector eY of the camera associated with the gimbals, and dot_eT_eE represents the inner product of the position vector eT of the target and the unit vector eE of the visual axis vector of the camera associated with the gimbals. Further, |eT|=|eE|=1.

Accordingly, the virtual tracking error values (dltX, dltY) of the target position in the virtual camera coordinate system Σc associated with the virtual gimbals are given by $$dltX = dot\_eT\_eX / dot\_eT\_eE$$

$$dltY = dot\_eT\_eY / dot\_eT\_eE \quad [9]$$

By substituting the virtual tracking error values (dltX, dltY) for the inputs (ΔX, ΔY) of the equation [4] to thereby apply the angular velocity generation rule expressed by the equation [4], orientation toward the position of the target can be realized.

Figure 9:
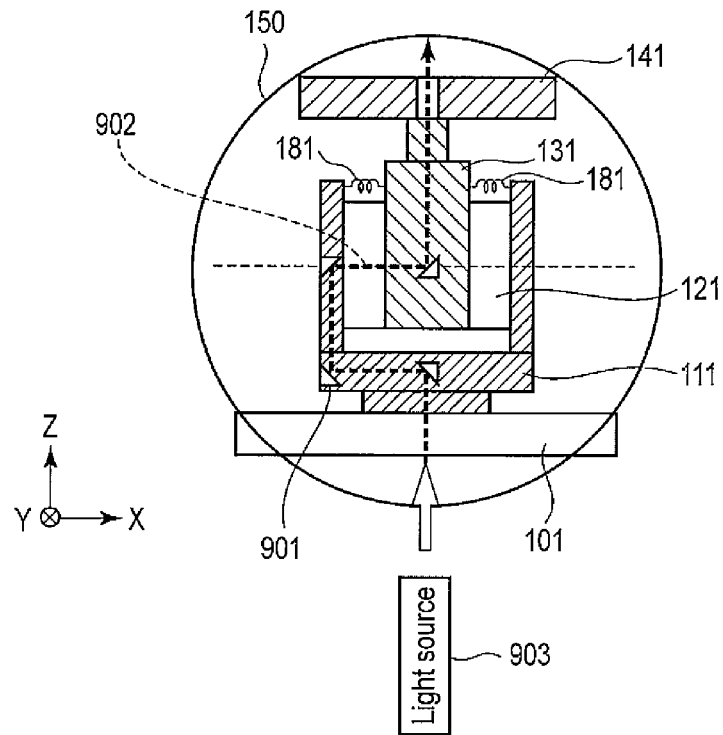
FIG. 9 is a schematic view illustrating a tracking system that emits light to a target.

Referring then to FIG. 9, a description will be given of a tracking system employed in the first embodiment for applying light to a target.

FIG. 9 is a view illustrating a light guiding system 902 provided inside the first, second and third gimbals 111, 121 and 131, and the movable body 141. FIG. 9 is a front view similar to FIG. 2B. FIG. 9 is a schematic sectional view of the spherical body 150, the first, second and third gimbals 111, 121 and 131, and the movable body 141. Inside the first, second and third gimbals 111, 121 and 131, there are provided mirrors 901, a light guiding path and a light source 903, which form a coude optical system, and the light guiding path extends through the movable body 141 to guide the light emitted from the light source 903. In the example of FIG. 9, the first gimbal 111 has three mirrors 901, and the third gimbal 131 has one mirror 901, and the light guiding path is indicated by the thick broken line. The light guiding path is formed of, for example, a hollow member, or a transparent material for permitting desired light to pass.

When the gimbals are rotated in accordance with the swing motion of the movable body 141, the mirrors 901 rotate in accordance with the attitudes of the gimbals. By guiding light from the base 110 side through the coude optical system, the light can be applied to a target regardless of the attitude of the movable body 141. Although in the optical system of the first embodiment, light is emitted from the center of the movable body 141, the optical axis of the movable body 141 can be changed by forming another light guiding path in the body. Further, if the optical system is provided in a reverse manner, the tracking apparatus may be modified such that light is guided from the movable body 141 and received by a target position identifying unit (such as a camera) provided on, for example, the base, instead of on the movable body 141.

In the above-described first embodiment, since a target is tracked using the spherical driving units, the problem of gimbal lock can be avoided, and since each driving axis does not require a high angular velocity, the whole apparatus can be made compact and light. Further, since the orientation of the camera can be detected using the gimbal mechanism driven in accordance with the swing motion of the movable body with, for example, a camera placed thereon, the camera serving as a target identifying sensor is permitted to automatically track the target in all directions.

Further, since the target identifying sensor formed of, for example, the camera is provided on the movable body, the position of the target detected from an image obtained by the camera is on the same coordinate system as that of the driving directional vector of the movable body, thereby simplifying the image tracking control rule.

Yet further, the orientation of the camera and the attitude of the movable body can be detected by the driven gimbal mechanism and the four angle sensors. By calculating a virtual tracking error obtained by the camera on the movable body with respect to a target position vector of an arbitrary direction, the camera can be oriented in an arbitrary direction.

Furthermore, by providing a coude optical system in the gimbal mechanism and the movable body coupled thereto, light can be applied to the target automatically tracked.

(Second Embodiment)

Referring to FIGS. 10A and 10B, a description will be given of a tracking apparatus according to a second embodiment. FIGS. 10A and 10B schematically illustrate the tracking apparatus of the second embodiment. FIG. 10A is a perspective view obtained in the direction defined by vector (X, Y, Z)=(1, −1, 1), with the positive Z-direction set as the zenith direction. FIG. 10B is a front view obtained in the negative Y-direction. The tracking apparatus of the second embodiment differs from that of the first embodiment in that in the former, the movable body 141 is movable over the outer surface of a spherical body with the wheels of the movable body 141 kept in contact with the outer surface.

In addition to the movable body 141, the tracking apparatus of the second embodiment comprises a spherical body 1001, a cover 1002, a drive hold unit 1003, first, second and third gimbals 111, 121 and 131, a base 101, first, second, third and fourth angle sensors 112, 122, 132 and 142, wheels 151, 152 and 153, a target position identifying unit 161, a tracking error detecting unit 162, a control unit 163, and first, second and third wheel driving units 171, 172 and 173. Although FIGS. 10A and 10B do not show all components, elements similar to those shown in FIG. 1 are incorporated in the tracking apparatus of the second embodiment. A description will now be given of only different elements.

The movable body 141 is provided outside the spherical body 1001, and is kept in contact with the outer surface of the spherical body 1001 via the wheels 151, 152 and 153. The movable body 141 is movable over the outer surface of the spherical body 1001. As in the first embodiment, the spherical driving units and the target position identifying unit 161 are attached to the movable body 141. The first, second and third gimbals 111, 121 and 131 are provided inside the spherical body 1001, and operate in the same way as in the first embodiment. The movable body 141 is connected to the third gimbal via the drive hold unit 1003. A rotary spring driving mechanism 181 is provided in associated with the third rotation axis 130, as in the first embodiment. The rotary spring driving mechanism 181 returns the third gimbal 131 to the center of the rotation range thereof. The drive hold unit 1003 urges the spherical driving units of the third gimbal 131 against the spherical body 1001. The drive hold unit 1003 connects the movable body 141 to the third gimbal 131 to permit the movable body 141 and the third gimbal 131 to freely rotate relative to each other.

The movable body 141 is connected to the third gimbal 131 via the drive hold unit 1003. The movable body 141 is provided perpendicular to the third rotation axis 130, and can rotate about a movable axis 140 as a movably supported fourth rotation axis. The movable body 141 includes, for example, a permanent magnet section, and the drive hold unit 1003 includes, for example, a coil. In this case, when a current is passed through the coil, the magnet serves as an electromagnet to connect the movable body 141 to the third gimbal 131, and also to enable the drive hold unit 1003 to support the movable body 141 so that the movable body 141 can rotate about the movable axis 140. Further, the movable body 141 is stuck to the spherical body 1001 by the attraction force of the electromagnet, thereby pressing the omni-wheels against the spherical body 1001.

Since thus the omni-wheels are pressed against the spherical body 1001 with an appropriate force by the electromagnet of the drive hold unit 1003, the spherical driving units can transfer the driving forces of the wheel driving units to the spherical body 1001 using the frictional forces between the spherical body 1001 and the omni-wheels.

In the second embodiment, since the movable body 141 exists outside the spherical body 1001, the rotation angle of the movable body 141 about the movable axis 140 may be detected by a method different from that of the first embodiment. For instance, the fourth angle sensor 142 may be formed of, for example, an optical encoder. In this case, the rotation angle of the movable body 141 with respect to the third gimbal 131 is optically detected by permitting light through the spherical body 1001.

Further, the cover 1002 has a size sufficient to cover the movable body 141, the target position identifying unit 161, the spherical driving units, the spherical body 1001 and the base 101, and is formed of a material that permits the target position identifying unit 161 to identify a target. For example, the cover 1002 is formed of a transparent material that permits the light to be detected by the target position identifying unit 161.

The second embodiment constructed as the above can provide the same advantage as the first embodiment. Since the gimbals are provided inside the spherical body and the movable body and the spherical driving units are provided outside the spherical body, the gimbals, and the movable body and spherical driving units, can be subjected to maintenance work individually. Further, since the gimbals are provided inside the spherical body and the movable body and the spherical driving units are provided outside the spherical body, the wiring of driving units (such as motors) included in the spherical driving units is prevented from being entangled with the gimbals. In contrast, in the first embodiment, since the gimbals, the movable body and the spherical driving units are provided inside the spherical body, the wiring, for example, is prevented from projecting therefrom.

Yet further, since in the embodiments, target tracking is possible without causing a great angular velocity about a particular rotation axis, the embodiments are applicable to a device, such as an image monitoring device, for tracking a moving object. In addition, since in the embodiments, light guiding is possible while the tracking apparatus is oriented in all directions, the embodiments are applicable to a device, such as a laser peening apparatus, a three-dimensional processor, and a video image display device, which are oriented to a light emission system. Also, since in the embodiments, the light or radiation received by the movable body 141 can be transmitted to a fixed section, such as the base, the embodiments are applicable to a device for orienting a light collective solar panel or a receiving antenna.

The embodiments are not limited to the above-described embodiments, but can be modified in various ways without departing from its scope. For instance, the embodiments are not limited to a triaxial gimbal structure, but can be easily modified to have such a redundancy as to couple the movable body 141 to a bi-axial gimbal structure via an elastic material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tracking apparatus comprising:
    a spherical body;
    a first gimbal supported by a bottom of the spherical body and configured to rotate about a first gimbal axis extending vertical;
    a second gimbal supported by the first gimbal and configured to rotate about a second gimbal axis perpendicular to the first gimbal axis;
    a third gimbal supported by the second gimbal and configured to rotate about a third gimbal axis perpendicular to the second gimbal axis at an intersection between the first gimbal axis and the second gimbal axis;
    a movable body supported by the third gimbal and configured to rotate about a fourth gimbal axis perpendicular to the third gimbal axis;
    three or more spherical driving units connected to the movable body and kept in contact with portions of the spherical body to move the movable body in a desired direction;
    a hold unit connecting the third gimbal to the movable body, and holding the spherical driving units pressed against the spherical body;
    an identifying unit supported by the movable body and configured to output position data of a target;
    a first angle sensor configured to detect a first rotation angle of the first gimbal relative to the bottom;
    a second angle sensor configured to detect a second rotation angle of the second gimbal relative to the first gimbal;
    a third angle sensor configured to detect a third rotation angle of the third gimbal relative to the second gimbal;
    a fourth angle sensor configured to detect a fourth rotation angle of the movable body relative to the third gimbal;
    a rotation spring driving unit configured to return the third gimbal to a center of a rotation range of the third gimbal; and
    a control unit configured to control the spherical driving units to track the target, using the first to fourth rotation angles.

2. The apparatus according to claim 1, wherein the spherical driving units comprise wheels capable of moving in directions different from a direction of rotation of the movable body, and wheel driving units configured to rotate the wheels to move the movable body onto the spherical body.

3. The apparatus according to claim 1, further comprising a light source, wherein a light guiding system is provided in the first to third gimbals and the movable body to guide light from the light source through the light guiding system to the target.

4. The apparatus according to claim 1, wherein
    the spherical driving units are kept in contact with an inner surface of the spherical body via wheels to hold the third gimbal and the movable body;
    the hold unit includes a spring between the third gimbal and the movable body, and presses the spherical driving units against the spherical body using the spring.

5. The apparatus according to claim 1, wherein
    the movable body includes a permanent magnet;
    the spherical driving units are kept in contact with an outer surface of the spherical body via wheels to hold the third gimbal and the movable body; and
    the hold unit includes a coil and is configured to press the spherical driving units against the outer surface of the spherical body by an electromagnetic force that occurs between the magnet and the coil.

6. The apparatus according to claim 1, wherein the spherical driving units and the identifying unit are set such that a driving directional vector used to move the movable body in a desired direction over the spherical body has a same coordinate system as a coordinate system of the position data.

7. The apparatus according to claim 1, wherein the control unit uses the first to fourth rotation angles to calculate virtual position data on a same coordinate system as a coordinate system of the identifying unit, and controls the spherical driving units to make the virtual position data coincide with the position data output by the identifying unit.

8. The apparatus according to claim 1, wherein the spherical driving units each includes a rotary body configured to rotate in contact with the spherical body, and a rotation spring configured to press the rotary body against the spherical body.

* * * * *